United States Patent
Chen et al.

(10) Patent No.: US 7,784,296 B2
(45) Date of Patent: Aug. 31, 2010

(54) SYSTEM AND METHOD FOR CONTROLLING AN AIR CONDITIONER OR HEAT PUMP

(75) Inventors: Yi Chen, St. Charles, MO (US); Jie Chen, St. Charles, MO (US); Allan J. Reifel, Florrisant, MO (US); David L. Koesterer, Belleville, MO (US)

(73) Assignee: Nordyne Inc., O'Fallon, MO (US)

( * ) Notice: Subject to any disclaimer, the term of this patent is extended or adjusted under 35 U.S.C. 154(b) by 636 days.

(21) Appl. No.: 11/683,445

(22) Filed: Mar. 8, 2007

(65) Prior Publication Data

US 2008/0216500 A1   Sep. 11, 2008

(51) Int. Cl.
*F25B 41/04* (2006.01)
(52) U.S. Cl. .............. 62/225; 62/157; 62/222; 62/224
(58) Field of Classification Search ............ 62/222, 62/224, 225, 157
See application file for complete search history.

(56) References Cited

U.S. PATENT DOCUMENTS

| | | | |
|---|---|---|---|
| 4,448,038 A | 5/1984 | Barbier | |
| 4,499,739 A | 2/1985 | Matsuoka et al. | |
| 4,571,951 A | 2/1986 | Szymaszek | |
| 4,617,804 A | 10/1986 | Fukushima et al. | |
| 4,787,213 A | 11/1988 | Gras et al. | |
| 4,807,445 A * | 2/1989 | Matsuoka et al. | 62/225 |
| 4,845,956 A | 7/1989 | Berntsen et al. | |
| 5,000,009 A | 3/1991 | Clanin | |
| 5,177,973 A * | 1/1993 | Cholkeri et al. | 62/222 |
| 5,303,562 A | 4/1994 | Bahel et al. | |
| 5,311,748 A | 5/1994 | Bahel et al. | |
| 5,396,780 A * | 3/1995 | Bendtsen | 62/225 |
| 5,666,815 A | 9/1997 | Aloise | |
| 5,689,963 A | 11/1997 | Bahel et al. | |
| 5,771,703 A | 6/1998 | Rajendran | |
| 5,806,327 A | 9/1998 | Lord et al. | |
| 6,148,628 A | 11/2000 | Reason et al. | |
| 6,260,368 B1 | 7/2001 | Redlich | |
| 6,318,100 B1 * | 11/2001 | Brendel et al. | 62/217 |

(Continued)

FOREIGN PATENT DOCUMENTS

EP   1134518 A2   9/2001

(Continued)

OTHER PUBLICATIONS

"Invitation to Pay Additional Fees and, Where Applicable, Protest Fees," International Filing Date: Feb. 19, 2008, International Application No. PCT/US2008/002138, Applicant:: Nordyne, Inc., Date of Mailing: Oct. 9, 2008, pp. 1-6.

*Primary Examiner*—Frantz F. Jules
*Assistant Examiner*—Daniel C Comings
(74) *Attorney, Agent, or Firm*—Cesari and McKenna, LLP; Michael R. Reinemann

(57) ABSTRACT

A control procedure operates an expansion valve of an air conditioning system. The control procedure utilizes a first control procedure to bring a calculated superheat value within a range of a target superheat value, and a second control procedure to cause the calculated superheat value to match the target superheat value. Both the first and second control procedures preferably use Proportional, Integral, Derivative control algorithms.

15 Claims, 10 Drawing Sheets

U.S. PATENT DOCUMENTS

| | | |
|---|---|---|
| 6,321,549 B1 | 11/2001 | Reason et al. |
| 6,715,304 B1 * | 4/2004 | Wycoff ........................ 62/155 |
| 6,769,264 B2 | 8/2004 | Moon et al. |
| 6,951,116 B2 | 10/2005 | Lee et al. |
| 2001/0037652 A1 * | 11/2001 | Sasayama et al. .............. 62/201 |
| 2008/0190125 A1 * | 8/2008 | Yoshioka et al. .............. 62/208 |

FOREIGN PATENT DOCUMENTS

| | | |
|---|---|---|
| GB | 2203865 A | 10/1988 |
| GB | 2274930 A | 8/1994 |
| JP | 02178567 A | 7/1990 |
| JP | 04244557 A | 9/1992 |
| JP | 08296912 A | 11/1996 |
| JP | 10038398 A | 2/1998 |
| JP | 10246517 A | 9/1998 |
| JP | 10318612 A | 12/1998 |
| JP | 2000074504 A | 3/2000 |
| JP | 2006071263 A | 3/2006 |
| JP | 2006105437 A | 4/2006 |
| WO | WO-2008/112063 A3 | 9/2008 |
| WO | WO-2008/112063 A9 | 9/2008 |

* cited by examiner

SYSTEM AND METHOD FOR CONTROLLING AN AIR CONDITIONER OR HEAT PUMP

BACKGROUND OF THE INVENTION

1. Field of the Invention

This invention relates to heating and cooling systems and, more specifically, to controlling heating and cooling systems.

2. Background Information

An air conditioner typically has at least four major components. Those components are a compressor, a condenser, a throttling device (such as a fixed orifice, a thermal expansion valve, or an electronic expansion valve), and an evaporator.

During normal operation, the compressor pumps the refrigerant from a low-pressure, low-temperature vapor state to a high-pressure, high-temperature vapor state. The hot refrigerant gas passes through the condenser, which is generally located outside in communication with ambient air. The condenser rejects heat to the ambient air typically though the use of an electric fan. The refrigerant leaving the condenser is normally in a sub-cooled liquid state. The liquid refrigerant then flows though the throttling device with a significant pressure drop. In particular, the throttling device controls the refrigerant's mass flow by regulating the degree to which the valve is opened. The refrigerant leaving the throttling device is in a saturated state where vapor and liquid coexist. The saturated refrigerant passes through the evaporator. A blower typically forces indoor air past the evaporator to cool the indoor air. As the indoor air heats up the refrigerant, the refrigerant evaporates into a vapor state. If all refrigerant is evaporated in the evaporator, the refrigerant returns to the compressor as superheated gas. Otherwise, liquid refrigerant may enter the compressor causing damage to the compressor, as liquid is largely incompressible. Superheat refers to the temperature of the vapor-state refrigerant above its boiling point.

The entry of two-state refrigerant into the compressor is more likely to occur upon startup of the air conditioner and at other times when a steady state has not yet been established (a transient state), such as a fan speed change that alters the heat transfer from the condenser or evaporator. Prior art EXV implementations generally maintain an appropriate flow of superheated gaseous refrigerant to the compressor during steady state operation, but such EXVs typically do not react quickly to transient states. While an EXV can be controlled to respond to a startup condition or fan speed change by applying a preprogrammed adjustment, there is still the possibility that some liquid-state refrigerant may enter the compressor. This is because the EXV is adjusting its flow based upon various predictions for refrigerant performance. The predictions may not take into account all circumstances (for example, colder inlet air, humidity levels, a non-standard refrigerant charge, etc). The compressor's life, moreover, can be shortened even if only a small amount of incompressible liquid enters the compressor and/or only momentarily.

In addition, the dramatic change in refrigerant superheat level during startup and transient states was often handled by a complete opening or closing of the EXV. This shortens valve life.

Thus, a need exists to ensure that all refrigerant entering the compressor is in the gaseous state and free of liquid-state constituents, and to increase EXV life and improves system performance under all operating conditions.

SUMMARY OF THE INVENTION

Briefly, the invention relates to a control procedure for controlling an air conditioning or a heat pump system. In the illustrative embodiment, the air conditioning system has an expansion valve, such as an electronic expansion valve (EXV), and an EXV controller operatively coupled to the EXV. The invention overcomes the disadvantages of the prior art by providing an EXV and EXV controller that measures the condition of the refrigerant upstream of the compressor, and adjusts the EXV in response to the measured state so that the refrigerant exiting the evaporator is at a desired superheat level, thereby preventing any appreciable liquid-state constituents from entering the compressor. Compressor damage is thereby avoided, and compressor life is lengthened. The control procedure adjusts the EXV so that a target superheat value is quickly achieved, thereby improving the air conditioning system's efficiency. The preferred embodiment of the control procedure also minimizes the degree of opening and closing of the EXV, thereby lengthening its life and allowing the system to respond better and more quickly to dramatic changes in superheat. The control procedure also improves cooling capacity and performance.

The air conditioning and/or heat pump system includes a compressor, a condenser, and an evaporator, all of which are connected together by a refrigerant flow path. The EXV is preferably disposed in the fluid flow path between the condenser and the evaporator. The EXV controller controls the opening of the EXV in order to regulate the refrigerant mass flow and to maintain a desired degree of superheat at the compressor inlet based on sensor measurements.

In a first embodiment, the EXV controller receives a temperature measurement and a pressure measurement of the refrigerant downstream of the evaporator outlet and upstream of the compressor. Preferably, the pressure measurement is adjacent to the evaporator, and the temperature measurement is adjacent to the pressure measurement to avoid inaccuracies in superheat measurements. The EXV controller uses the pressure measurement to compute the refrigerant's saturation temperature. The EXV controller then calculates the superheat by subtracting the saturated temperature from the measured temperature.

In a second embodiment, the EXV controller receives a first temperature measurement taken at the evaporator, and a second temperature measurement taken within the refrigerant path at a point that is downstream of the evaporator, and upstream of the compressor. The EXV controller calculates the superheat level of the refrigerant downstream of the evaporator by subtracting the first temperature measurement from the second temperature measurement. The EXV controller may use a superheat adjustment if the point at which the second temperature measurement is taken is too far away from the first temperature measurement to compensate for the pressure drop along the refrigerant path.

BRIEF DESCRIPTION OF THE DRAWINGS

The invention description below refers to the accompanying drawings, of which.

DETAILED DESCRIPTION OF AN ILLUSTRATIVE EMBODIMENT

Figure 1:
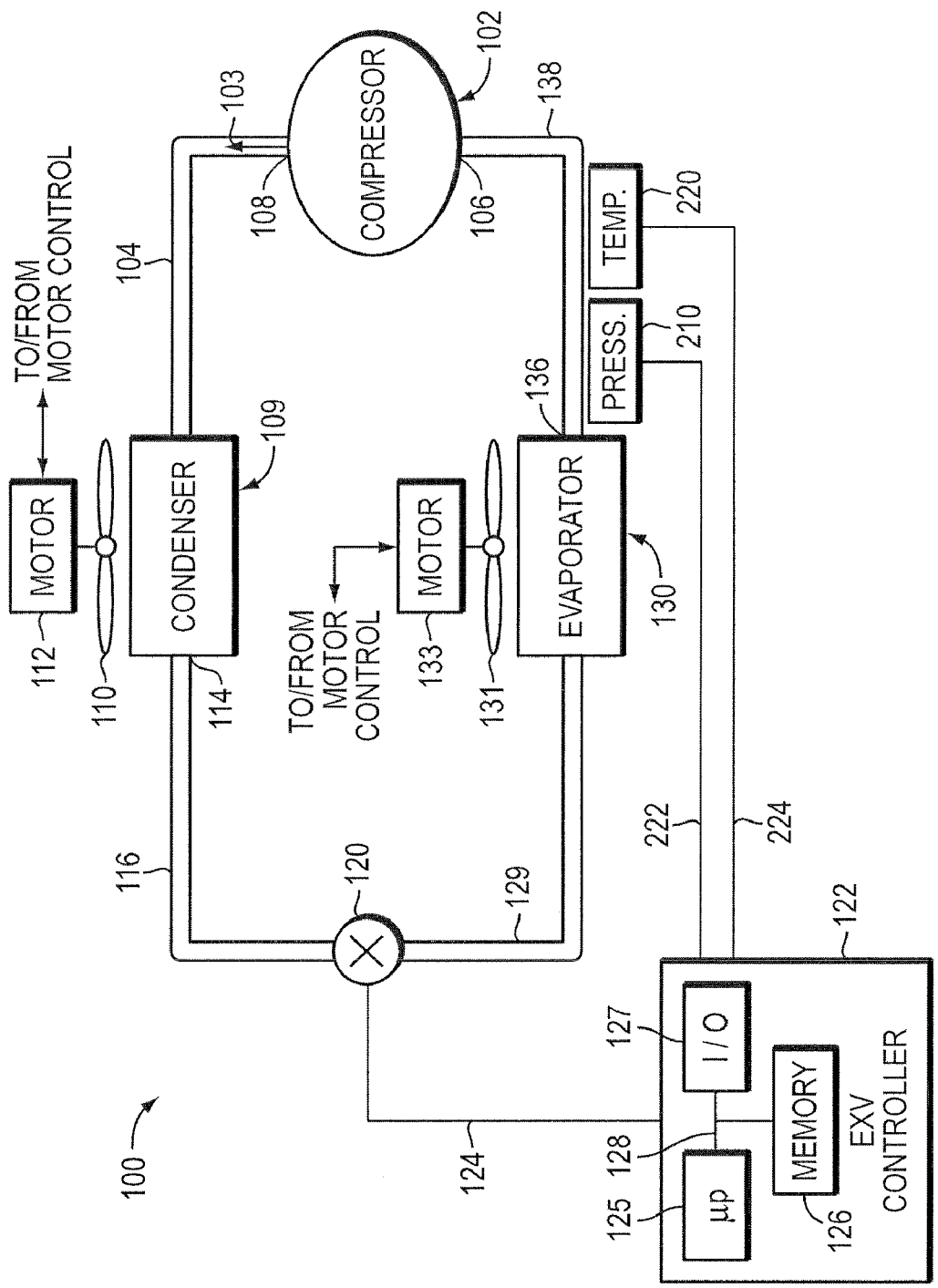
FIG. 1 is a highly schematic diagram of a preferred air conditioning system employing temperature and pressure sensors.

FIG. 1 illustrates an air conditioning system 100 according to an illustrative embodiment of the present invention. The system 100 includes a compressor 102 that pumps (in the direction of arrow 103) refrigerant along an appropriate conduit 104. The compressor 102 includes an inlet 106 that receives low-pressure, low-temperature vapor, and an outlet 108 that discharges a high-pressure, high-temperature vapor. The high-pressure fluid enters a condenser 109 that communicates with ambient air provided by a fan 110 having a motor 112 that is operated by a speed control (not shown). The condenser 109 may include conventional cooling vanes and/or other structures that facilitate heat transfer. The refrigerant departs the condenser outlet 114 in a sub-cooled liquid state. The liquid refrigerant passes through an expansion valve or device, such as an electronic expansion valve (EXV) 120, which receives control signals from an EXV controller 122 via control link 124. The EXV controller 122 basically controls the degree to which the EXV 120 is opened or closed in accordance with a control procedure implemented by the EXV controller 122. In particular, the EXV 120 has an open position, a closed position and a plurality of intermediary positions. The EXV controller 122 issues one or more commands to the EXV (or to a motor or other device operating the EXV) causing it to move from its current position to a new position.

Refrigerant passing through the EXV 120 is provided to an evaporator 130, which is served by a blower 131. The blower 131 is powered by a motor 133, which may include a variable speed function as well as an on/off function controlled by the air conditioning system. In typical implementations, the evaporator 130 and the blower 131 are placed in-line with a heating-ventilation-and-air-conditioning (HVAC) duct network within an interior space so that the heat in air delivered from the duct network's return duct is transferred to the refrigerant via the evaporator, resulting in chilled air on the downstream side of the duct network. This chilled air is delivered to the interior space. Assuming that the EXV 120 properly regulates the level of refrigerant allowed to enter the evaporator 130, the refrigerant at an outlet 136 of the evaporator 130 is now in a superheated vapor state, being heated sufficiently to eliminate all liquid-state constituent from the refrigerant before it enters the compressor 102 to repeat the cycle. As noted above, if the refrigerant still contains largely incompressible liquid, it may damage the compressor 102.

As mentioned above, the air conditioning system 100 includes an EXV controller 122. In the preferred embodiment, the EXV controller includes a microprocessor (μP) 125, a memory 126, and input/output (I/O) element(s) 127 that are interconnected by a bus 128. The μP 125 in cooperation with the memory 126, I/O element(s) 127 and bus 128 executes program instructions. The program instructions may be implemented in hardware, software, or a combination of hardware and software, such as firmware. Alternatively, the control procedure can be implemented using analog electronics control techniques in conjunction with associated analog circuitry.

Those skilled in the art will understand that other data handling devices, such as state machines, ladder logic, etc., may be used in place of or in addition to the μP 125.

In the embodiment of FIG. 1, a refrigerant pressure sensor 210 is placed in communication with the refrigerant closely adjacent to the outlet 136 of the evaporator 130. A temperature sensor 220, also in communication with the refrigerant, is positioned closely adjacent to and preferably downstream of the pressure sensor 210. Each sensor 210, 220 communicates with the EXV controller 122. The EXV controller 122 carries out a control procedure to operate the EXV 120. Briefly, the control procedure uses the pressure value to compute the refrigerant's saturation temperature based upon known thermodynamic relationships. The superheat of the refrigerant at the evaporator outlet is then calculated by the control procedure by subtracting the saturated temperature from measured temperature.

Suitable components for system 100 include the SBD series of air conditioners from Nordyne, Inc. of O'Fallon, Mo. Suitable EXVs include the Q series of EXVs from is San Hau, China and the Ham series of EXVs from Fujikoki, Japan.

Those skilled in the art will recognize that the present invention may be used with other systems besides air conditioning systems, such as a heat pump system.

Figure 2:
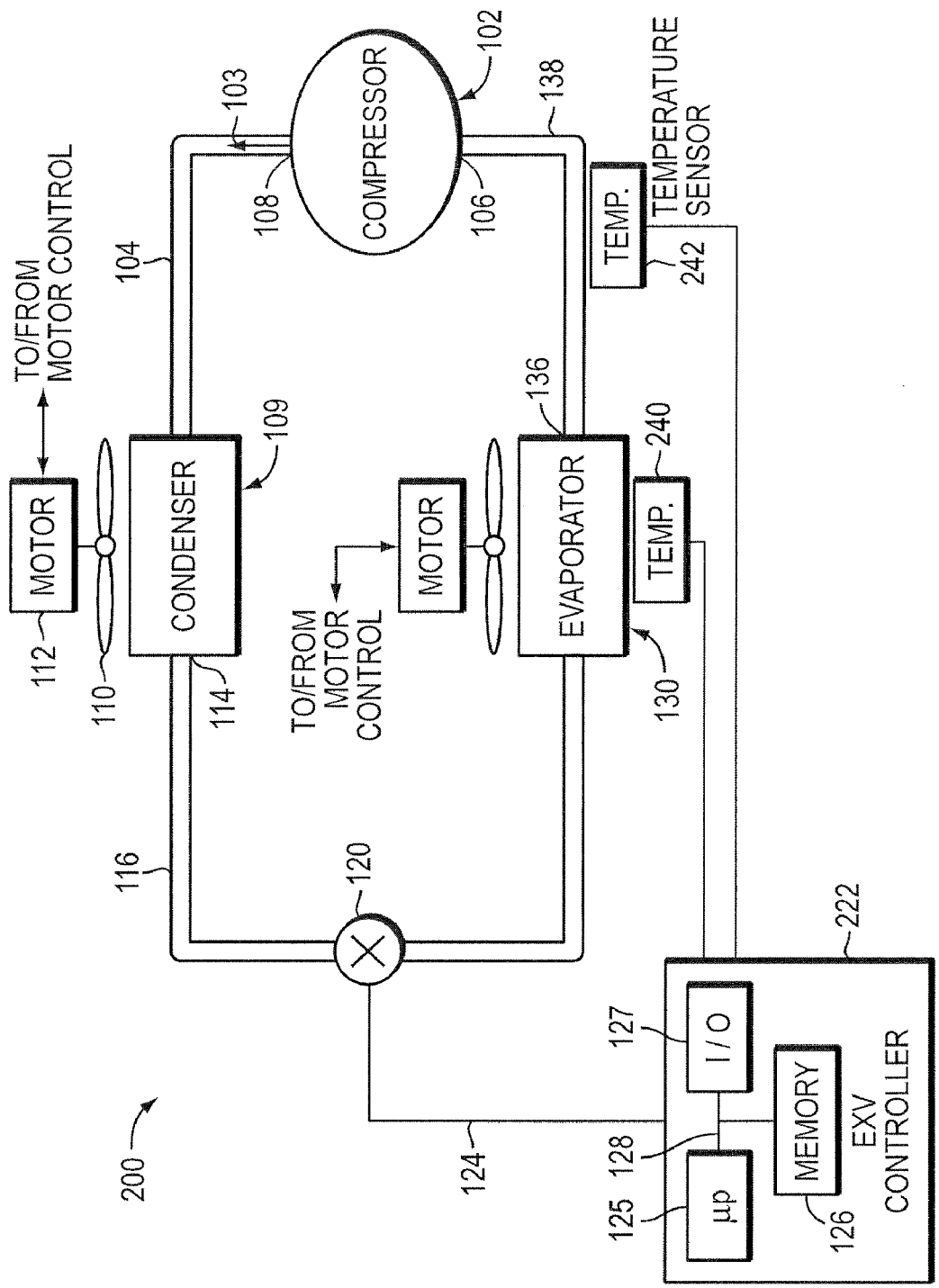
FIG. 2 is a highly schematic diagram of a preferred air conditioning system employing two temperature sensors.

FIG. 2 illustrates an air conditioning system 200 according to a second embodiment of the present invention. The air-conditioning system 200 includes components that are similar or identical to those described with reference to FIG. 1 above. Such like components have been similarly numbered, e.g., compressor 102, condenser 109, EXV 120, evaporator 130 and blowers 110, 131. According to the embodiment of FIG. 2, the desired gaseous state at the compressor inlet 106 is attained by controlling the EXV 120 to move between open and closed positions in response to readings of the prevailing temperature of the refrigerant by a first temperature sensor 240 provided in communication with the fluid flow through the evaporator 130, and a second temperature sensor 242 provided in communication with the fluid flow at the outlet 136 of the evaporator. An EXV controller 222 receives temperature readings from the temperature sensors 240, 242. The EXV controller 222 preferably uses these temperature readings to calculate the degree of superheat. Briefly, the superheat level of the refrigerant downstream of the evaporator 130 is calculated by subtracting the first temperature measurement from the second temperature measurement.

Figure 3:
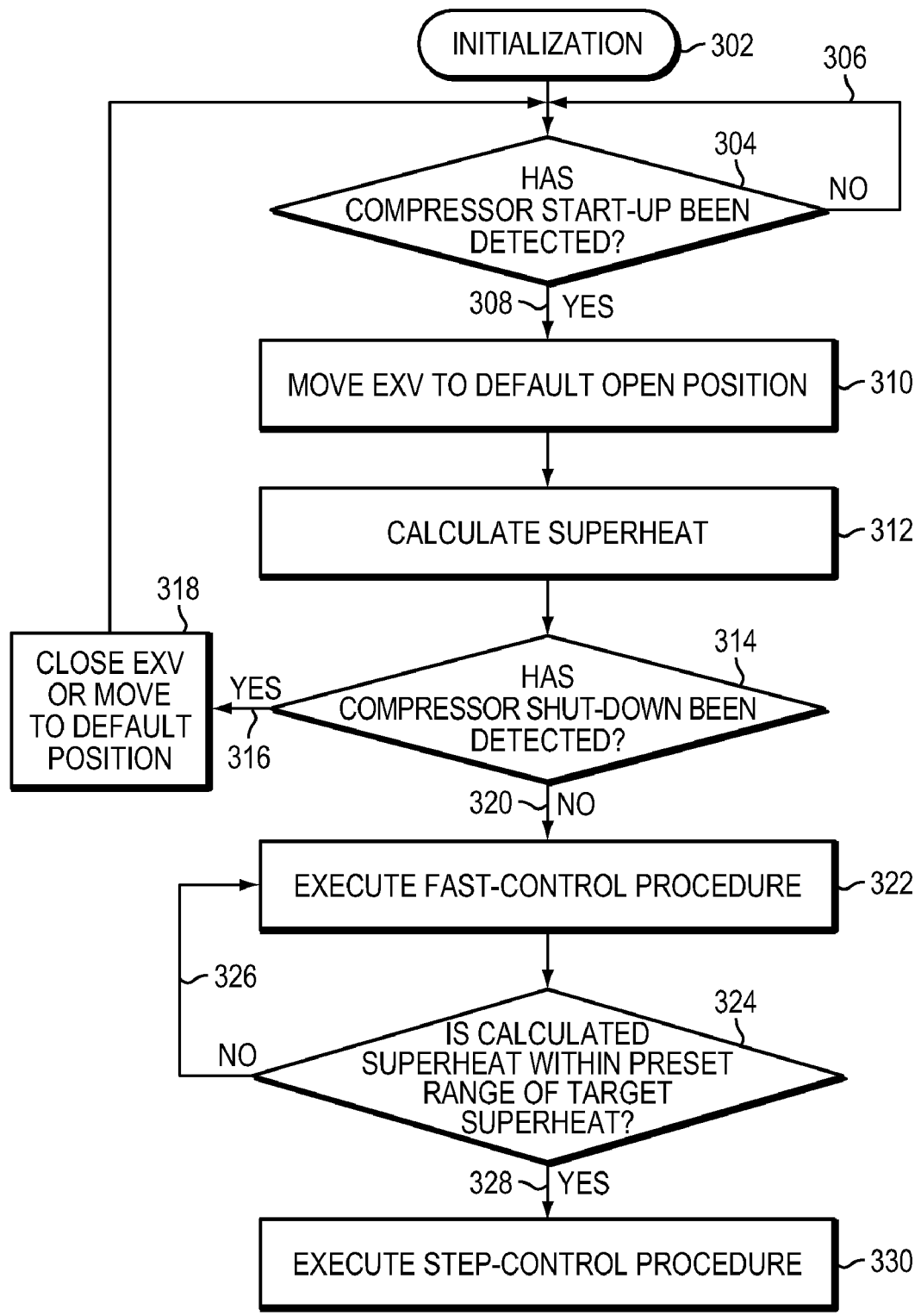
FIG. 3 is a high-level flow diagram of a preferred method in accordance with the present invention.

FIG. 3 is a flow diagram of a method in accordance with a preferred embodiment of the present invention. The EXV controller 126 preferably performs an initialization step, as indicated at block 302. Initialization may include moving the EXV 120 (FIG. 1) to a closed position by issuing a series of close commands that exceeds the number of steps supported by the EXV 120. The EXV controller 126 determines whether the compressor 102 has been started, as indicated by decision block 304. This may be done by determining the superheat of the vapor exiting the evaporator 130. For the air conditioning system of FIG. 1, which uses pressure and temperature transducers, a compressor start-up condition is determined when the superheat is greater than a certain value, e.g., when the superheat exceeds the target superheat by 2° Fahrenheit (F). For the air conditioning system of FIG. 2, which uses two temperature transducers, a compressor start-up condition is determined when the superheat is less than a certain value, e.g., −3° F. It should be understood that the EXV controller 126 may also or alternatively receive a signal that the compressor 106 has started.

If the EXV controller 126 concludes that the compressor 102 has not been started, then it waits some period of time, and again determines whether a start-up condition is detected, as indicated by No arrow 306 which loops back on decision block 304. If the EXV controller 126 determines that the compressor 102 has started, it moves the EXV 120 to a default open position, as indicated by Yes arrow 308 leading to block 310. The EXV controller 126 calculates the superheat of the vapor leaving the evaporator 130, as indicated at block 312.

As indicated by decision block 314, the EXV controller 126 determines whether the compressor 102 has shut-down. If so, the EXV 120 is closed or moved to a default open position, as indicated by Yes arrow 316 leading to block 318. This default open position may be the same or different from the default open position of block 310. By closing the EXV immediately after the compressor is turned off, refrigerant migration from the condenser to the evaporator, as well as the time to reach steady state operation later when the compressor is turned back on, are both minimized. Thus, the efficiency of the system is improved. For certain types of compressors, it is preferable to leave the EXV open during the compressor off time in order to prevent excessive torque required to start the compressor. If the compressor has not been shut-down, the EXV controller 126 preferably executes a fast control procedure for operating the EXV 120 as indicated by No arrow 320 leading to block 322. The EXV controller 126 determines whether the calculated superheat is within a preset range of the target superheat, as indicated by decision block 324. A suitable target superheat is 5 to 15° F. A suitable preset range is ±2 to 6° F. of the target superheat. The fast control procedure is used to bring the calculated superheat value within the preset range quickly and efficiently.

If the calculated superheat value is still outside of the preset range, as determined at decision block 324, processing continues with the fast-control procedure, as indicated by No arrow 326 looping back to block 322. If the calculated superheat value is within the preset range, the EXV controller 126 preferably executes a step control procedure for operating the EXV 120 as indicated by Yes arrow 328 leading to block 330. The step control procedure is used to bring the calculated superheat into a match condition with the target superheat. The calculated superheat is considered to match the target superheat when it is within ±0 to 1° F. of the target superheat. As described herein, when the calculated superheat matches the target superheat, the EXV controller 122 stops adjusting the EXV 120, and leaves it in its current position.

It should be understood that, in a preferred embodiment, the EXV controller 126 continues to determine whether the compressor has been shut-down, while executing both the fast-control procedure of block 322, and the step-control procedure of block 330. If such a shut-down is detected, the EXV controller 126 closes the EXV or moves it to a default position as reflected by block 318 described above.

It should be further understood that the EXV controller 126 may check whether the calculated superheat matches the target superheat and/or is within the preset range of the target superheat at other points, such as after decision block 314.

Those skilled in the art will recognize that the steps described above may be performed in other orders and/or that additional steps may also be performed.

Temperature-Pressure Control Procedure

Figure 4A:
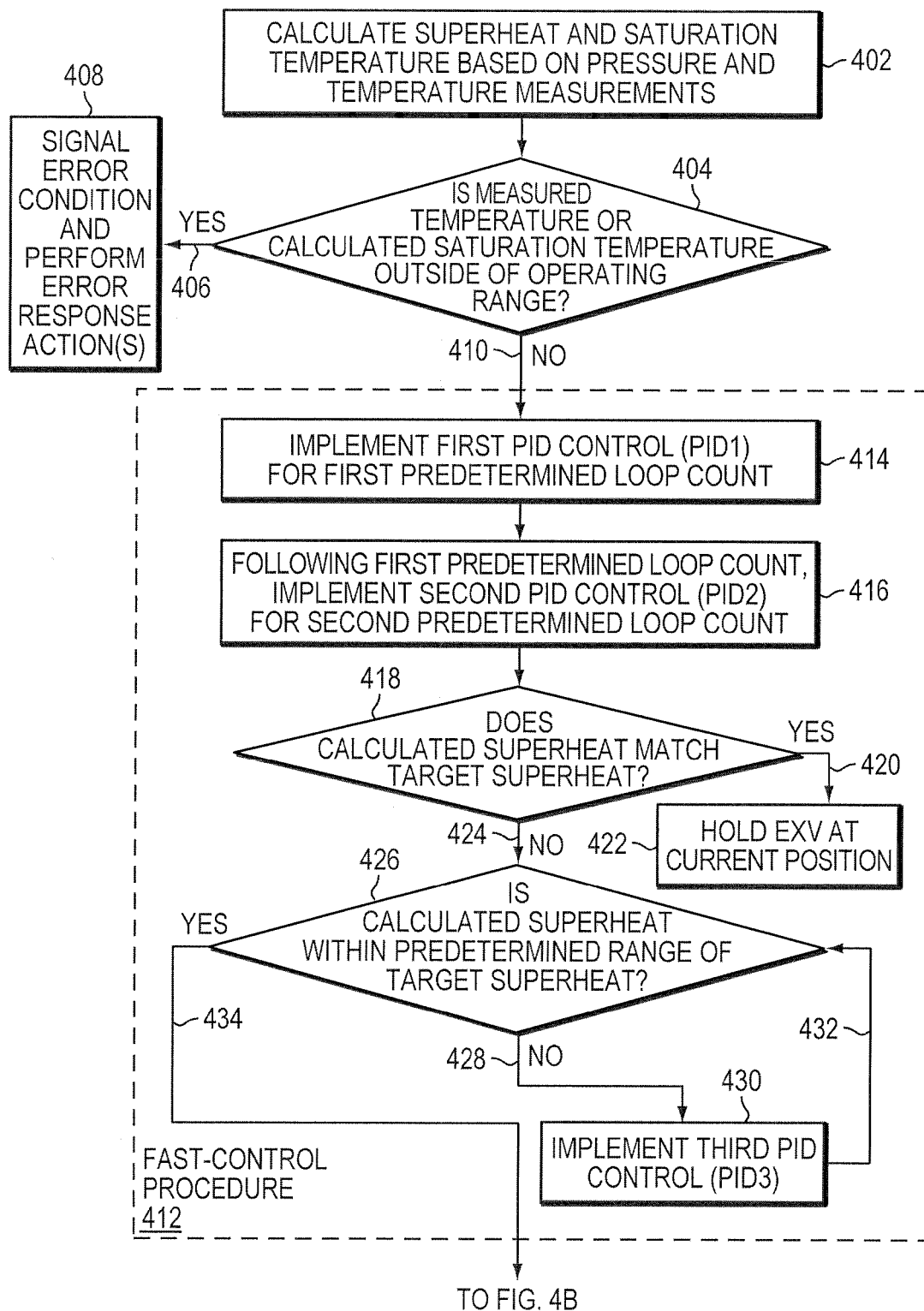
FIG. 4 is a high-level flow diagram of a preferred method for controlling an EXV in accordance with the embodiment of FIG. 1.
Figure 4B:
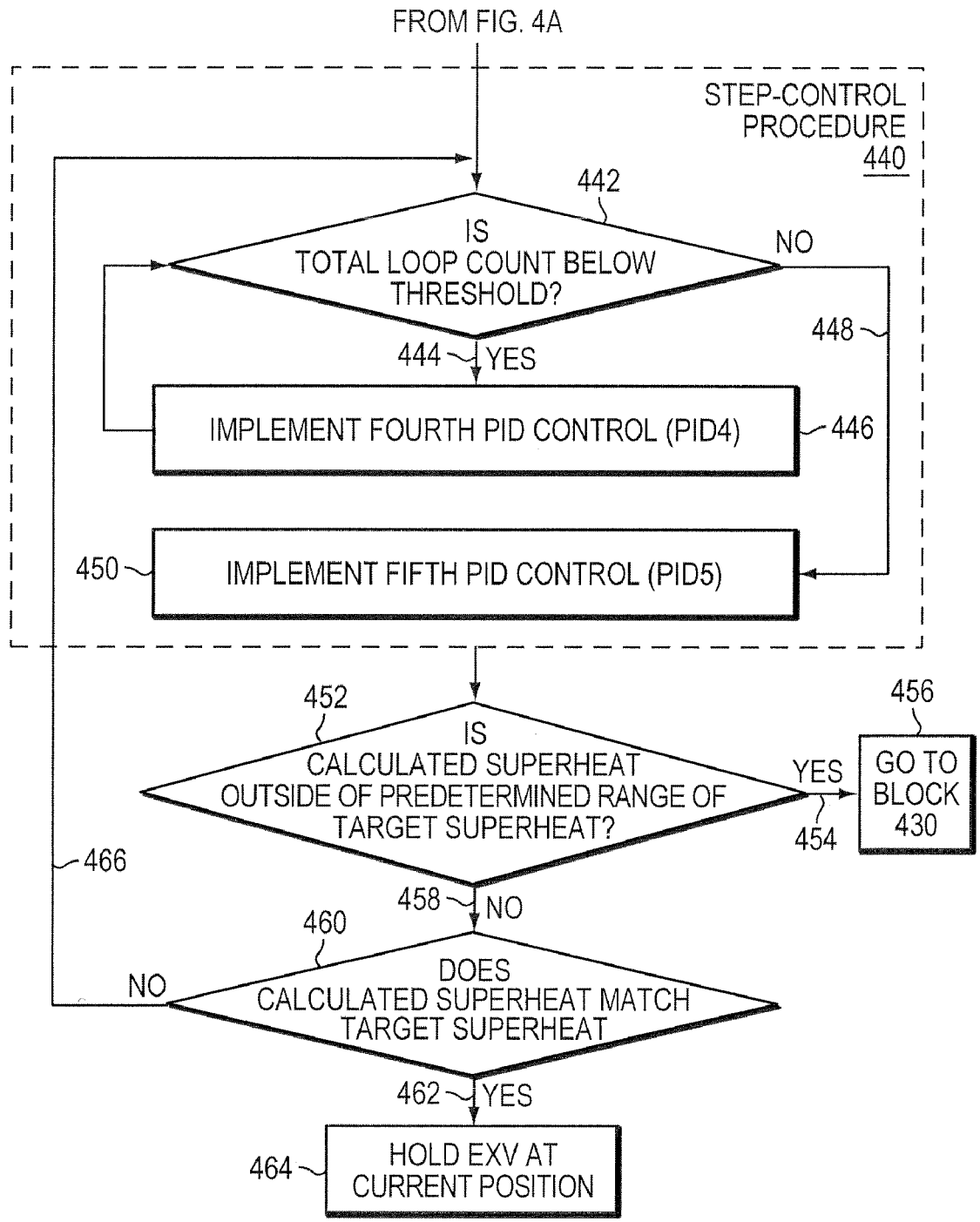

FIGS. 4A and 4B are a highly schematic illustration of a preferred method of operation of the EXV controller 122 of FIG. 1.

The EXV controller 122 calculates the superheat value and the saturation temperature of the vapor exiting the evaporator 130 based on the pressure and temperature measurements from the transducers 210, 220, as indicated at block 402 (FIG. 4A). In the preferred embodiment, the EXV controller 122 samples the pressure and temperature inputs at a predetermined rate, such as value between 2 to 10 seconds. It should be understood that the EXV controller 122 may be preconfigured with the saturation temperature of the vapor based on the refrigerant properties. The EXV controller 122 preferably calculates the superheat by subtracting the saturation temperature of the vapor from the measured temperature as detected by temperature transducer 220. The EXV controller 122 also determines whether the measured temperature or the calculated saturation temperature are outside of a predetermined operating range, thereby indicating incorrect sensor readings, as indicated by decision block 404. If so, the EXV controller 122 signals an error condition, such as activating an LED on a control or operator panel, and performs one or more error response actions, such as opening the EXV 120 to a default position, as indicated by Yes arrow 406 leading to block 408.

The EXV controller 122 also stores the number of EXV 120 step changes in memory 126.

If the measured temperature and the calculated saturation temperature are within acceptable ranges, the EXV controller 122 preferably implements a fast-control procedure for operating the EXV 120, as indicated by No arrow 410 leading to the fast-control block 412. In the fast-control mode 412, the EXV controller 122 starts off with a fast Proportional, Integral, Derivative (PID) control algorithm, referred to as PID1, for a predetermined control loop count, as indicated by block 414. Each sampling of input data by the EXV controller 122, which may or may not result in an adjustment from the current position of the EXV, corresponds to one loop count. The fast PID control procedure is defined as a primary proportional PID control with small P, e.g., within the range from 10-40, with I in the range of 0-30, and D in the range of 0-30. A suitable loop count for PID1 is 2-12. After the first predetermined loop count, the EXV controller 122 preferably implements a second PID control algorithm for another predetermined loop count, referred to as PID2, as indicated by block 416. Suitable P, I and D values for the PID2 control algorithm are P=10-50, I=0-30, and D=0-30, and a suitable loop count is 10-40.

In the PID2 control mode, rather than using the target superheat as the control goal, the EXV controller 122 calculates a temporary superheat setting based on the target superheat using the following formula:

SuperheatSetting=superheat+((40+(pidcount−pidstart))/(2+(pidcount−pidstart)))−1.

where,
superheat is the original superheat setting,
pidcount is the loop count, and
pidstart is a predetermined value preferably between 2 to 12.

As the measured superheat is typically very high just after the compressor start, using the above formula allows the superheat setting to match the measured superheat closely during compressor start-up. As the loop count in PID2 mode increases, the measured superheat approaches the Superheat-Setting defined above, thereby resulting in faster control of the superheat during compressor start-up.

In the illustrated embodiment, after the loop count for PID2 is reached, the EXV controller 120 determines whether the calculated superheat matches the target superheat, as indicated by decision block 418. If so, the EXV controller 122 maintains the EXV 120 at its current position, as indicated by Yes arrow 420 leading to block 422. If the calculated superheat does not match the target superheat, the EXV controller 122 in accordance with the illustrative embodiment determines whether the calculated superheat is within a predetermined range of the target superheat, as indicated by No arrow 424 leading to decision block 426. If the calculated superheat is outside of the predetermined range, the EXV controller 122 preferably implements a third PID control algorithm, referred to as PID3, as indicated by No arrow 428 leading to block 430. Suitable P, I and D values for the PID3 control algorithm are P=30-80, I=10-50 and D=10-50. While implementing the PID3 control algorithm, the EXV controller 122 periodically determines whether the current superheat value is within the predetermined range, e.g., within 2-6° F., of the target superheat, as indicated by arrow 432 which loops back on decision block 426. If the calculated superheat is not yet within the predetermined range of the target superheat, the EXV controller 122 continues with the PID3 control algorithm, as indicated above.

If the calculated superheat is within the predetermined range of the target superheat, control of the EXV moves to the step-control procedure, as indicated by Yes arrow 434 leading to the step-control procedure 440 (FIG. 4B). In the preferred embodiment, the step-control procedure operates as follows. The EXV controller determines the total loop count since the compressor was turned on and whether that total loop count is below a predetermined threshold, e.g., 60-100, as indicated by decision block 442. A loop count of 60 typically corresponds to approximately three minutes, and a loop count of 100 typically corresponds to approximately five minutes. If the loop count is below the threshold, the EXV controller 122 preferably implements a fourth PID control algorithm, referred to as PID4, as indicated by Yes arrow 444 leading to block 446. Suitable P, I and D values for the PID4 control algorithm are P=40-180, I=10-50, D=10-50. If the total loop count exceeds the threshold, e.g., 100, the EXV controller 122 preferably implements a fifth PID control algorithm, referred to as PID5, as indicated by No arrow 448 leading to block 450. Suitable P, I and D values for the PID5 control algorithm are P=40-400, I=10-50 and D=10-50. The EXV controller 122 also uses a longer sampling rate for the pressure and temperature transducers 210, 220, such as between 4 to 10 seconds while implementing the PID5 control algorithm. Similarly, if the total loop count exceeds the threshold while implementing the PID4 control algorithm, the EXV controller preferably switches over to the PID5 control algorithm, again as indicated by No arrow 448 leading to block 450.

While implementing the step-control procedure 440, the EXV controller 122 continues to calculate a superheat value and determine whether it is within the predetermined range of the target superheat, as indicated by decision block 452. If the calculated superheat falls outside of the predetermined range while implementing the step-control procedure, the EXV controller preferably reverts back to the PID3 control algorithm, as indicated by Yes arrow 454 leading to Go To block 456, which returns processing to block 430 (FIG. 4A). In an alternative embodiment, the EXV controller may revert back to the PID4 control algorithm. The EXV controller also continues to determine if the calculated superheat value matches the target superheat value, as indicated by No arrow 458 leading to decision block 460. If the calculated superheat value matches the target superheat, then the EXV controller 122 stops adjusting (i.e., opening or closing) the EXV 120, and instead holds the EXV 120 at its current position, as indicated by Yes arrow 462 leading to block 464. If the calculated superheat value does not match the target superheat (but it is still within the predetermined range), then the EXV controller preferably continues on with the step-control procedure, as indicated by No arrow 466, which returns processing to block 442.

The EXV controller 122 may store a value in memory 126 corresponding to the life of the EXV 120 in terms of open/close cycles. The EXV controller 122 may be further configured to permanently open the EXV 120 after the number of open/close cycles exceeds this lifetime value.

Two Temperature Control Procedure

Figure 5A:
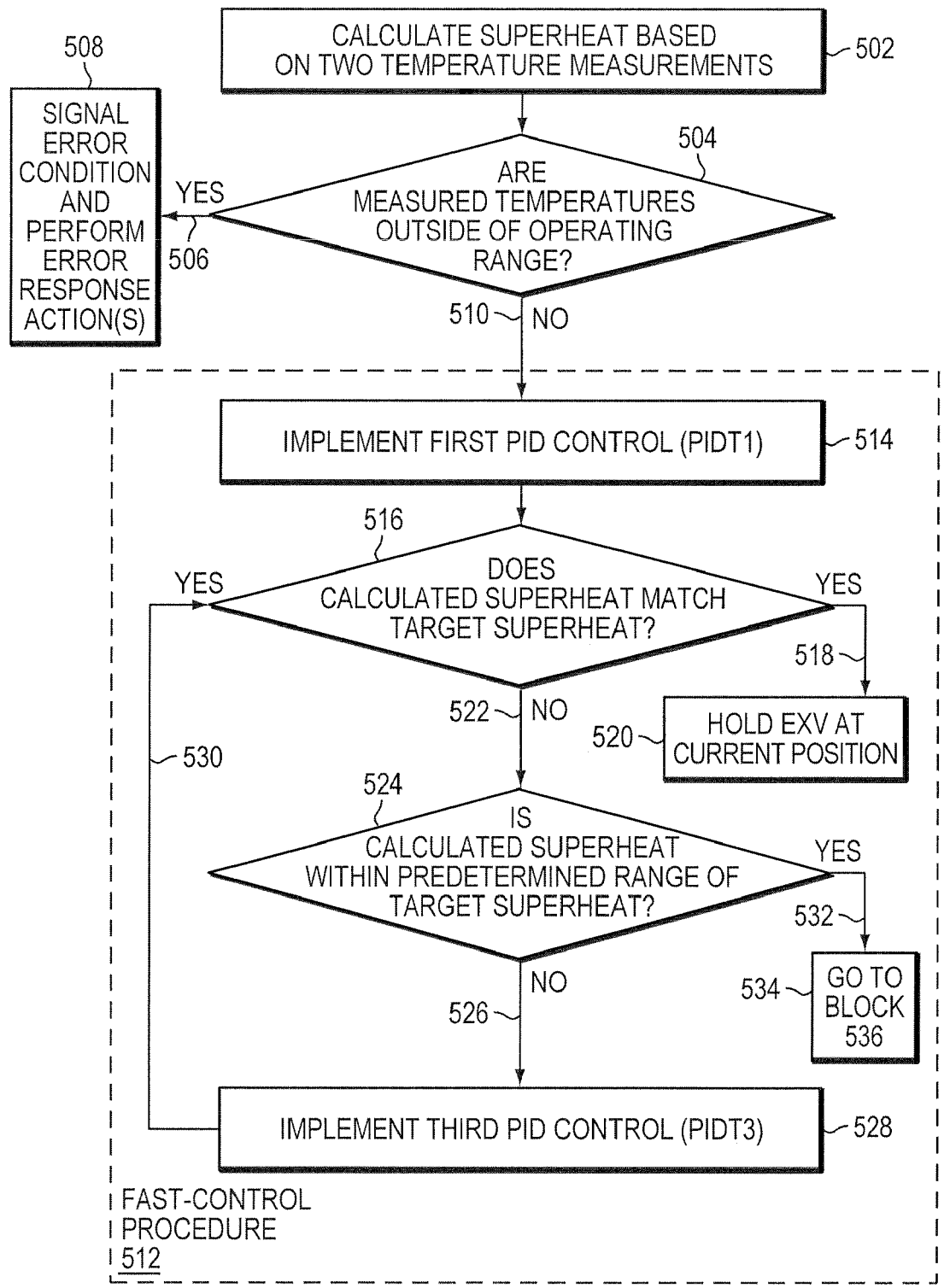
FIG. 5 is a high-level flow diagram of a preferred method for controlling an EXV in accordance with the embodiment of FIG. 2.
Figure 5B:
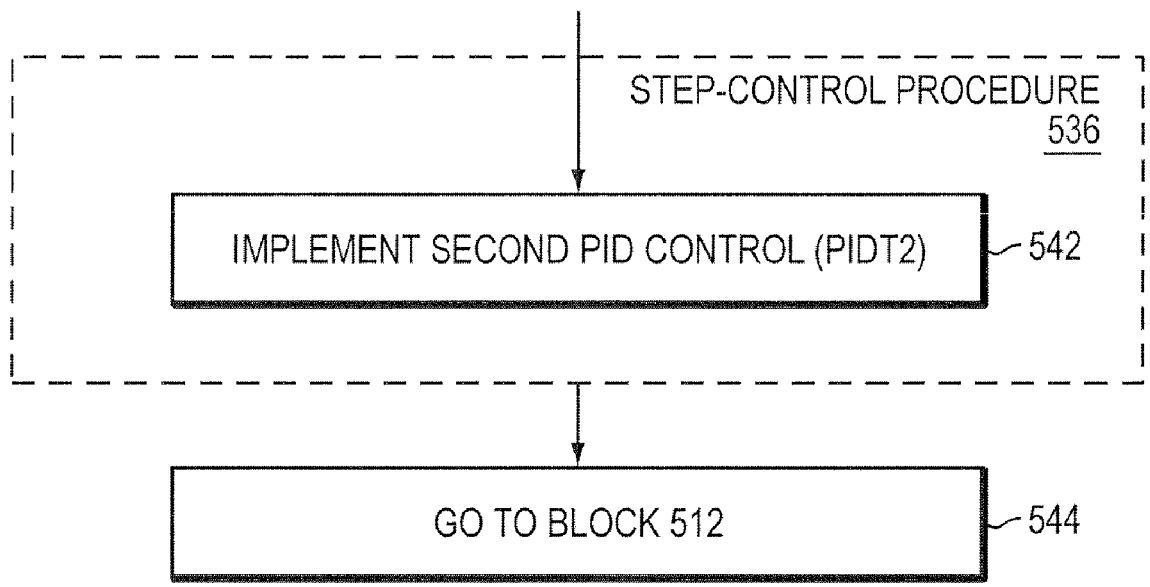

FIGS. 5A and 5B are a highly schematic illustration of a preferred method of operation of the EXV controller 222 of FIG. 2.

The EXV controller 222 calculates the superheat value of the vapor exiting the evaporator 130 based on the two temperature measurements from the transducers 240, 242, as indicated at block 502 (FIG. 5A). In the preferred embodiment, the EXV controller 222 samples the two temperature inputs at a predetermined rate, such as value between 2 to 12 second. The EXV controller 222 preferably calculates the superheat by subtracting the temperature value corresponding to temperature transducer 242, which measures the temperature of the refrigerant near the evaporator inlet, from the temperature value corresponding to temperature transducer 240 which measures the temperature of the refrigerant near the evaporator outlet. The EXV controller 222 determines whether either or both of the measured temperatures are outside of a predetermined operating range, thereby indicating incorrect sensor readings, as indicated at decision block 504. If so, the EXV controller 222 signals an error condition, such as activating an LED on a control or operator panel, and performs one or more error response actions, such as opening the EXV 120 to a default position, as indicated by Yes arrow 506 leading to block 508.

As with the prior implementation, the EXV controller 222 also stores the number of EXV 120 step changes in memory 126.

If the two measured temperatures are within acceptable ranges, the EXV controller 222 preferably implements a fast-control procedure for operating the EXV 120, as indicated by No arrow 510 leading to the fast-control procedure 512. In the fast-control mode, the EXV controller 222 starts off with a first PID control algorithm, referred to as PIDT1, as indicated at block 514. Due to the typically slower response of temperature sensors, such as thermisters, as compared to pressure sensors, the EXV controller 222 employs a slower sample rate, such as 4-8 seconds, while implementing the PIDT1 control algorithm for a predetermined loop count of 10-40. Furthermore, a temporary superheat setting based on the target superheat is preferably determined according to the following formula:

$$\text{SuperheatSetting} = \text{Csuperheat} + (\text{Superheat} - \text{Csuperheat})*0.1$$

where,

Csuperheat is the calculated superheat, and

Superheat is the original target superheat.

Suitable P, I and D values for the PIDT1 control algorithm are P=200-600, I=0-40 and D=0-40.

Furthermore, a default EXV open position, such as 50% open, is also used as an input to the PID control (different from common PID control) in such a way that the output of the next EXV position remains the same as the default position (the actual EXV opening remains the same in PIDT1). However, all the static variables in the PID control are converged to the values as if the default opening is maintaining the target superheat. That is, the variables stay at the values corresponding to the default opening, and the difference between the target superheat and the determined superheat is ignored. This is preferably done in order to take account of the fact that temperature transducers typically have a relatively slow response time.

Those skilled in the art will understand that the default open position may change depending on valve size.

After the predetermined loop count, the EXV controller 222 determines whether the calculated superheat matches the target superheat, as indicated by decision block 516. If so, the EXV controller 222 maintains the EXV 120 at its current position, as indicated by Yes arrow 518 leading to block 520. If the calculated superheat does not match the target superheat, the EXV controller 222 determines whether the calculated superheat is within a predetermined range of the target superheat, as indicated by No arrow 522 leading to decision block 524. If the calculated superheat is outside of the predetermined range, the EXV controller 222 implements another PID control algorithm, referred to as PIDT3, as indicated by No arrow 526 leading to block 528. While implementing PIDT3, the sample rate is set between 2 to 4 seconds. The P value is preferably between 180-380. The I and D values are set according to the P value in such a way that the superheat offset and oscillation are minimized. Suitable I and D values are I=20-80 and D=5-20. As shown, the PIDT3 control algorithm generally uses more EXV steps. It is used to bring the superheat quickly under control.

The EXV controller 222 continues to calculate a new superheat value and check whether that calculated superheat value matches the target superheat value or is within the predetermined range of the target superheat value as indicated by arrow 530, which loops back to decision block 516.

If the calculated superheat is within the predetermined range as determined at decision block 524, processing proceeds to the step-control procedure 536 (FIG. 5B), as indicated by Yes arrow 532 and Go To block 534.

The step-control procedure is preferably implemented through another PID control algorithm, referred to as PIDT2, as indicated at block 542. In the PIDT2 control algorithm, the sample rate is preferably set between 4 to 8 seconds. The P is set to 500-700. The I and D values are set according to the P value in such a way that the superheat offset and oscillation are minimized. Suitable I and D values are I=20-80 and D=5-20. The PIDT2 mode generally uses a small number of EXV steps, and is used when the superheat is under control.

Processing then returns to decision block 512, as indicated by Go To block 544.

Returning to decision block 520, if the calculated superheat is within the predetermined range, processing jumps to the step-control procedure 536 (FIG. 5B) as indicated by Yes arrow 548 leading to Go To block 550.

Single Outdoor Temperature Control Procedure

Figure 6:
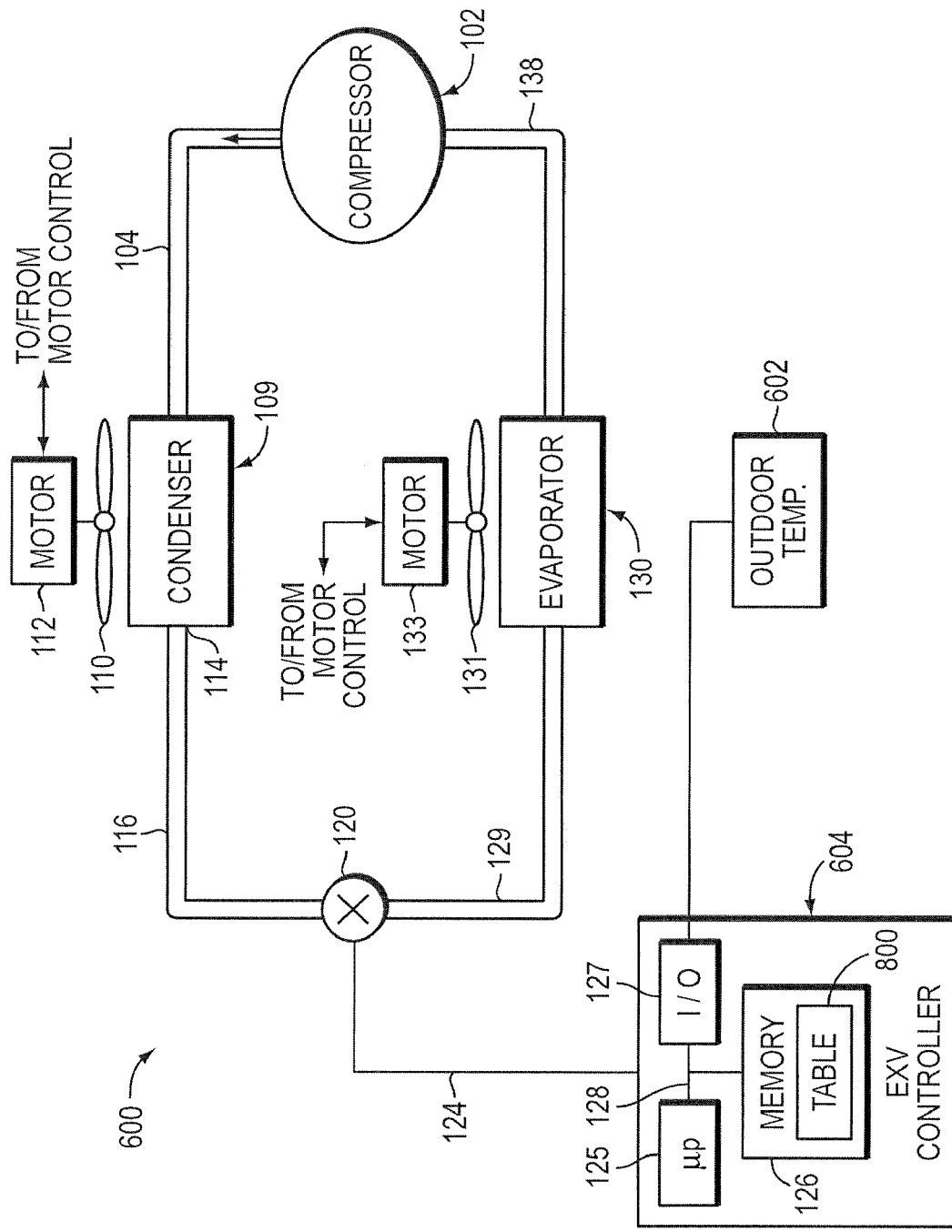
FIG. 6 is a highly schematic diagram of a preferred air conditioning system employing an outside temperature sensor.

FIG. 6 illustrates an air conditioning system 600 according to a third embodiment of the present invention. The air-conditioning system 600 includes components that are similar or identical to those described with reference to FIGS. 1 and 2 above. Such like components have been similarly numbered, e.g., compressor 102, condenser 109, EXV 120, evaporator 130 and blowers 110, 131. According to the embodiment of FIG. 6, the desired gaseous state at the compressor inlet 106 is attained by controlling the EXV 120 to move between open and closed positions in response to a reading of outdoor air temperature by an outdoor temperature sensor 602. An EXV controller 604 receives temperature readings from the temperature sensor 602. The memory 126 of the EXV controller 604 preferably stores one or more look-up tables, such as table 800, which is described in more detail below. The EXV controller 604 preferably uses the outdoor temperature reading to control the EXV 120. In this embodiment, the EXV controller 604 does not calculate a superheat value.

Figure 7:
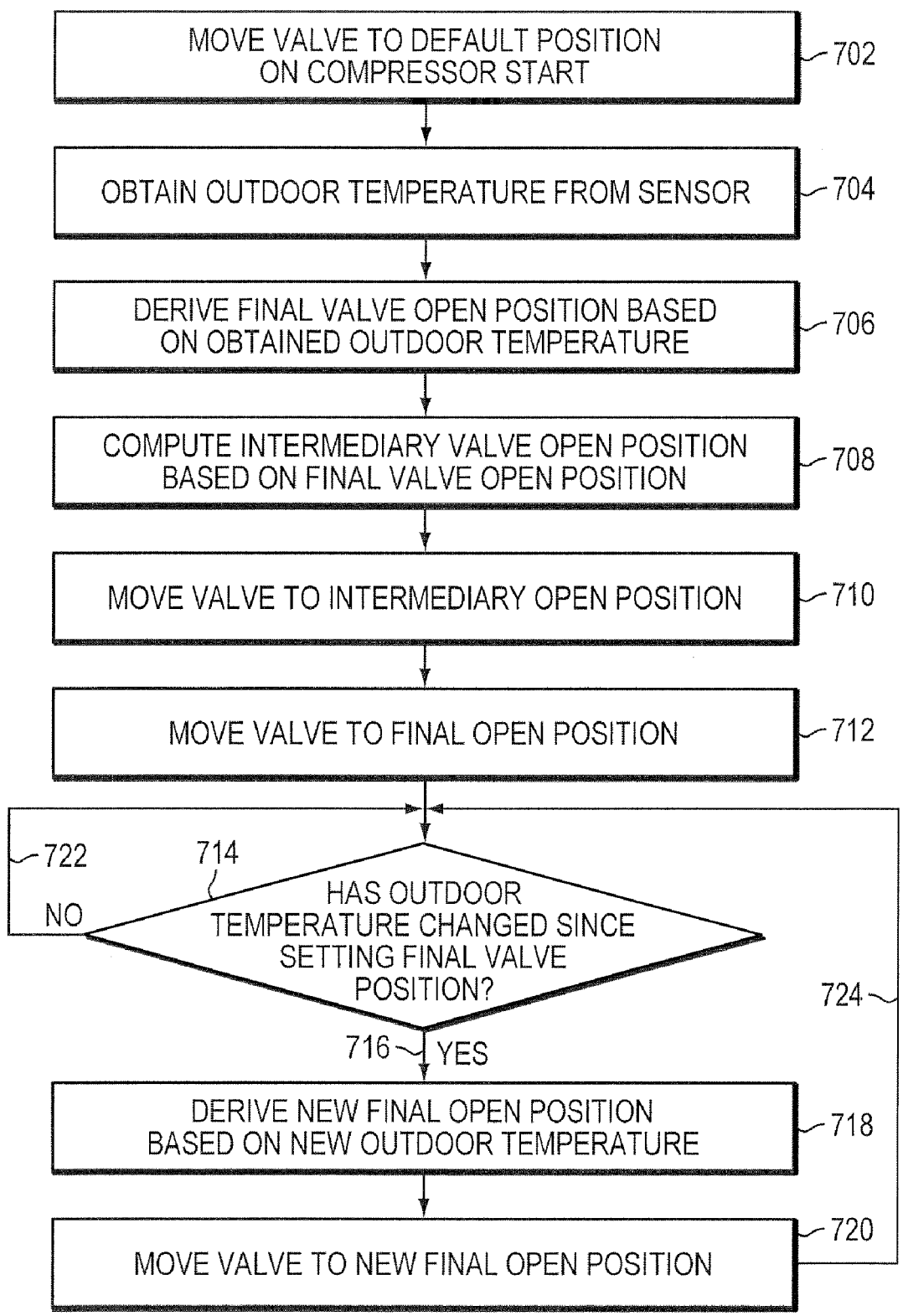
FIG. 7 is a high-level flow diagram of a preferred method for controlling an EXV in accordance with the embodiment of FIG. 6.

FIG. 7 is a flow diagram of a preferred control process implemented by the EXV controller 604. Upon detecting a compressor on condition, the EXV controller 604 preferably moves the EXV 120 to a default open position, as indicated at block 702. A suitable default open position may be on the order of 50%. In a preferred embodiment, a default position is determined for each type of EXV by testing that EXV. The EXV controller 604 obtains an outdoor temperature value from sensor 602, as indicated at block 704, and derives a final EXV open position, as indicated at block 706. In the preferred embodiment, the EXV controller 604 derives the final EXV open position by performing a look-up on the look-up table 800, using the outdoor temperature obtained at block 704.

Figure 8:
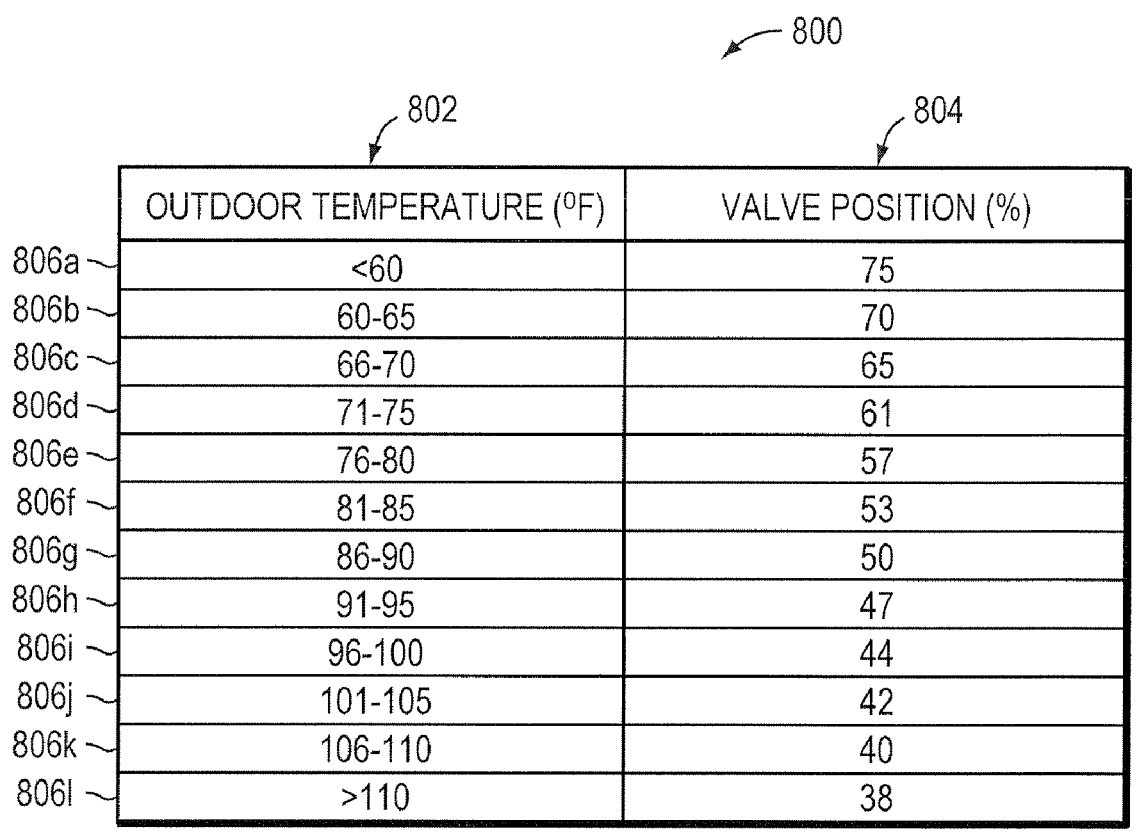
FIG. 8 is a highly schematic illustration of a data structure, specifically a table, in accordance with an illustrated embodiment of the present invention.

An exemplary look-up table 800 is illustrated if FIG. 8. In the preferred embodiment, the look-up table is organized as a table or array having a plurality of columns and rows whose intersections define cells for storing information or data. As shown in FIG. 8, table 800 has two columns: an outdoor temperature column 802 and an EXV valve position column 804. Table 800 also includes a plurality of rows 806a-l, and each row corresponds to a range of outdoor temperature values. Row 806a, for example, corresponds to an outdoor temperature of less than 60° F., row 806b corresponds to an outdoor temperature of between 60 and 65° F., row 806c corresponds to an outdoor temperature of between 66 and 70° F., and so on. As shown, for each row 806, there is a corresponding valve position. For example, for row 806a, the valve position is 75% open, for row 806b, the valve position is 70% open, for row 806c, the valve position is 65% open, and so on.

It should be understood that table 800 does not necessarily indicate the trend of an actual valve.

The information contained in look-up table 800 may be specific to a particular valve model, and an air conditioning cooling system capacity. The valve positions stored in table 800 may be obtained empirically, i.e., by testing the particular valve model. In a preferred embodiment, a valve is tested so as to determine the valve position(s) necessary to achieve a desired superheat value, e.g., 10° F.

Returning to FIG. 7, the EXV controller 604 computes an intermediary EXV open position, as indicated at block 708, based on the final valve position obtained from look-up table 800. The intermediary valve position is preferably computed in accordance with the following equation:

intermediary valve position=final valve position*$b$ where, $b$ is a constant preferably in the range of 1 to 3.

For example, if the final valve position from table 800 is 44% open and b is 2, then the intermediary valve position is 88% open.

The EXV controller 604 moves the EXV 120 from the default position to the computed intermediary position, e.g., 88% open, as indicated at block 710, preferably in a linear, step-wise fashion over the course of a first predetermined time period, which may be up to 20 seconds long. The EXV controller 604 preferably holds the EXV 120 at this intermediary valve position for a second predetermined time period, such as 20-50 seconds. At the end of the second predetermined time period, the EXV controller 604 moves the EXV 120 from the intermediary valve position to the computed final position, e.g., 44% open, as indicated at block 712, preferably in a linear, step-wise manner over the course of a third predetermined time period, e.g., 60-180 seconds. At this point, the EXV 120 is at the final valve position for the outdoor temperature.

The EXV controller 604 may periodically check the outdoor temperature as sensed by temperature sensor 602 and determine whether it corresponds to the outdoor temperature used to set the final valve position, as indicated at decision block 714. If the outdoor temperature differs from the outdoor temperature used to set the final valve position, the EXV controller 604 derive a new final valve position from look-up table 800 using the new outdoor temperature, as indicated by Yes arrow 716 leading to block 718. The EXV controller 604 then may move the EXV to this new valve open position, as indicated at block 720. If the outdoor temperature has not changed, the EXV controller 604 preferably leaves the EXV 120 at its present position, as indicated by No arrow 722, which loops back on decision block 714. Block 720 similarly loops back to decision block 714 as reflected by arrow 724 to indicate that the EXV controller 604 continues to periodically check the outdoor temperature.

It should be understood that the EXV controller 604 may also move the EXV 120 to a default position in response to the compressor being turned off.

It should be understood that memory may store a plurality of look-up tables each corresponding to a particular valve type or model and air conditioning system cooling capacity. The EXV 120 may be queried to determine its type or model and the EXV controller 604 may know or learn the capacity of the air conditioning system so as to access the appropriate look-up table.

In an alternative embodiment, the EXV controller 604 may be configured to compute a final valve open position based on the following equation:

$$\text{final valve open position} = INT(a + b*OD + c*OD^2 + d*OD^3)$$

where,

INT means to take the integer of the calculation, a, b, c and d are parameters, and OD is the outdoor temperature as measured by sensor 602.

Rather than having one or more look-up tables in the form of table 800, memory stores a series of values for the parameters a, b, c and d. Each series of values for a, b, c and d, moreover, may correspond to a particular type system, e.g., air conditioning or heat pump system, and its capacity, e.g., 2 ton, 3 ton, 3.5 ton, 4 ton, etc. Each series may further correspond to a particular type or model of EXV 120.

The EXV controller may be configured with the type of system, e.g., air conditioning or heat pump, and its capacity. With this information, the EXV controller obtains the proper series of values for the parameters a, b, c, and d, and computes the final valve position. Using the computed final valve position, the EXV can also compute an intermediary valve position as described above. The type of system, e.g., air conditioning or heat pump, and its capacity may be stored in memory 126, and may be retrieved by the EXV controller and used an index to obtain the proper series of values for the parameters a, b, c, and d.

The foregoing description has been directed to specific embodiments of this invention. It will be apparent, however, that other variations and modifications may be made to the described embodiments, with the attainment of some or all of their advantages. Therefore, it is an object of the appended claims to cover all such variations and modifications as come within the true spirit and scope of the invention.

What is claimed is:

1. A method for controlling an expansion valve of an air conditioning system having an evaporator configured to evaporate a refrigerant, the expansion valve having an open position, a closed position and a plurality of intermediary positions, the method comprising:

calculating a superheat value of the refrigerant exiting the evaporator;

determining whether the calculated superheat value matches a target superheat value;

if the calculated superheat value matches the target superheat value, leaving the expansion valve at its current position;

operating the expansion valve according to a first control procedure for adjusting the position of the expansion valve, the first control procedure implementing first and second Proportional, Integral, Derivative (PID) control algorithms where the first and second PID control algorithms are different from each other;

determining whether the calculated superheat value is within a preset range of a target superheat value;

if the calculated superheat value is outside of the preset range, operating the expansion valve in accordance with a third PID control algorithm to bring the calculated superheat within the preset range; and if the calculated superheat value is within the preset range, operating the expansion valve in accordance with a second control procedure for adjusting the position of the expansion valve to cause the calculated superheat to match the target superheat, wherein the first and second control procedures are different.

2. The method of claim 1 wherein the calculating is based on a pressure value and a temperature value of the refrigerant.

3. The method of claim 2 wherein:

the first PID control algorithm is implemented for a first predetermined control loop count; and the second PID control algorithm is implemented for a second predetermined loop count.

4. The method of claim 3 wherein the second PID control algorithm uses a superheat set point determined as follows:

$$\text{SuperheatSetting} = \text{superheat} + ((40 + (\text{pidcount} - \text{pidstart}))/(2 + (\text{pidcount} - \text{pidstart}))) - 1$$

where, superheat is the target superheat, pidcount is the loop count, and pidstart is a constant.

5. The method of claim 4 wherein the pidstart constant is between 2 and 12.

6. The method of claim 3 wherein the first PID control algorithm employs a Proportional value between 10 and 40, an Integral value between 0 and 30, and a Derivative value between 0 and 30.

7. The method of claim 3 wherein the second PID control algorithm employs a Proportional value between 10 and 50, an Integral value between 0 and 30, and a Derivative value between 0 and 30.

8. The method of claim 3 wherein the second control procedure includes:

implementing a fourth PID control algorithm if a total loop count is below a threshold; and implementing a fifth PID control algorithm if the total loop count exceeds the threshold.

9. The method of claim 1 wherein the air conditioning system further includes a compressor, the method further comprising, in response to detecting a shut-down of the compressor, moving the expansion valve to a closed position.

10. The method of claim 9 further comprising holding the expansion valve in the closed position until a subsequent start-up of the compressor.

11. A method for controlling an expansion valve of an air conditioning system having an evaporator configured to evaporate a refrigerant, the expansion valve having an open position, a closed position and a plurality of intermediary positions, the method comprising:

calculating a superheat value of the refrigerant exiting the evaporator;

determining whether the calculated superheat value matches a target superheat value;

if the calculated superheat value matches the target superheat value, leaving the expansion valve at its current position;

if the calculated superheat value does not match the target superheat value, operating the expansion valve in accordance with a PID control procedure for adjusting the position of the expansion valve that employs a temporary SuperheatSetting based on the target superheat value, wherein the temporary SuperheatSetting is determined as follows:

$$\text{SuperheatSetting} = \text{superheat} + ((40 + (\text{pidcount} - \text{pidstart}))/(2 + (\text{pidcount} - \text{pidstart}))) - 1$$

where,
superheat is the target superheat,
pidcount is a loop count, and
pidstart is a constant.

12. The method of claim 11 further comprising repeating the calculating, determining, leaving, and operating steps, wherein each calculating step is one loop count.

13. A method for controlling an expansion valve of an air conditioning system having an evaporator configured to evaporate a refrigerant, the expansion valve having an open position, a closed position and a plurality of intermediary positions, the method comprising:

calculating a superheat value of the refrigerant exiting the evaporator;

determining whether the calculated superheat value matches a target superheat value;

if the calculated superheat value matches the target superheat value, leaving the expansion valve at its current position;

if the calculated superheat value is outside of the present range of the target superheat value, operating the expansion valve in accordance with a first control procedure for adjusting the position of the expansion valve, the first control procedure implementing first and second Proportional, Integral, Derivative (PID) control algorithms where the first and second PID control algorithms are different from each other; and determining whether the calculated superheat value is within a preset range of a target superheat value;

if the calculated superheat value does not match the target superheat value following the first control procedure, operating the expansion valve in accordance with a second control procedure for adjusting the position of the expansion valve to cause the calculated superheat to match the target superheat, wherein the first and second control procedures are different, and
one of the first and second PID control algorithms of the first control procedure uses a superheat set point determined as follows:

$$\text{SuperheatSetting} = \text{superheat} + ((40 + (\text{pidcount} - \text{pidstart}))/(2 + (\text{pidcount} - \text{pidstart}))) - 1$$

where,
superheat is the target superheat,
pidcount is the loop count, and
pidstart is a constant.

14. The method of claim 13 wherein the pidstart constant is between 2 and 12.

15. The method of claim 14 further comprising repeating the calculating, determining, leaving, and operating steps, wherein each calculating step is one loop count.

* * * * *